No. 626,942. Patented June 13, 1899.
J. B. STEWART.
MAGNET CLUTCH FOR BRAKES.
(Application filed Nov. 4, 1897.)

(No Model.)

Witnesses
Inventor
Joseph B. Stewart
by Foster & Freeman
Attorneys

UNITED STATES PATENT OFFICE.

JOSEPH B. STEWART, OF HAVERSTRAW, NEW YORK.

MAGNET-CLUTCH FOR BRAKES.

SPECIFICATION forming part of Letters Patent No. 626,942, dated June 13, 1899.

Application filed November 4, 1897. Serial No. 657,380. (No model.)

*To all whom it may concern:*

Be it known that I, JOSEPH B. STEWART, a citizen of the United States, residing at Haverstraw, in the county of Rockland and State of New York, have invented certain new and useful Improvements in Magnet-Clutches for Brakes, of which the following is a specification.

My invention relates to magnetic clutches for railway-brakes and similar purposes; and it has for its object to provide a simple and effective clutch well adapted for the various purposes for which it is used; and to these ends my invention consists in a clutch embodying the features of construction substantially as hereinafter more particularly set forth.

Figure 1:
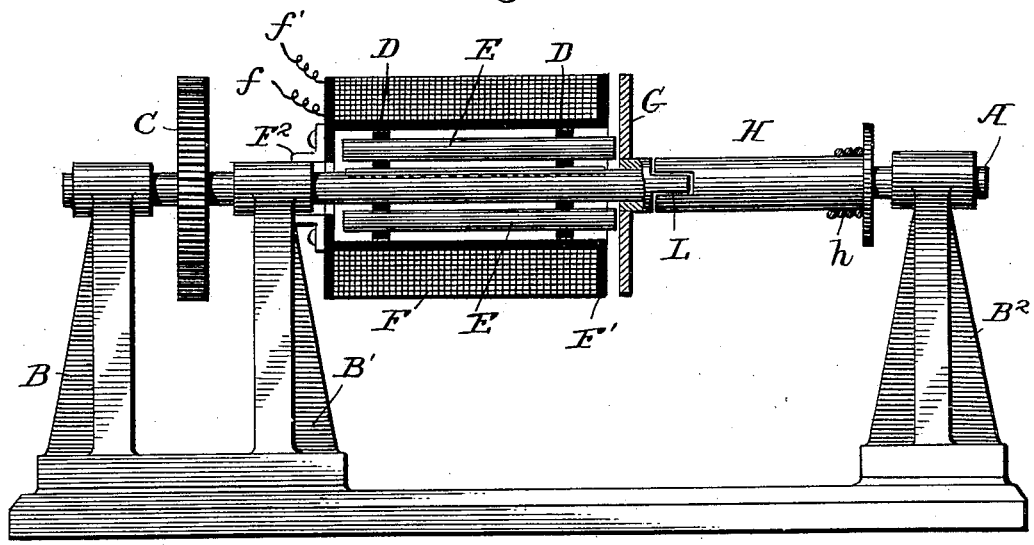
Figure 2:
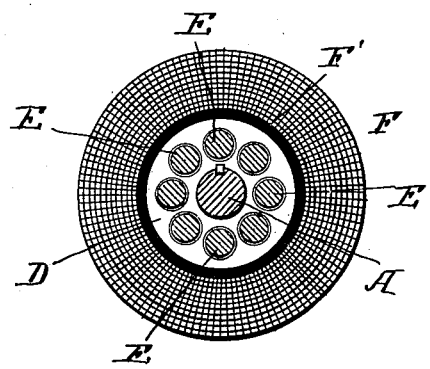
Figure 3:
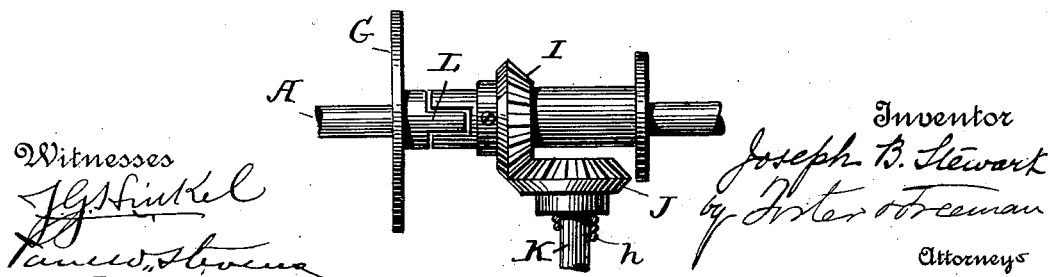

In the accompanying drawings, Figure 1 is a side view, partly in section, of a construction embodying my invention. Fig. 2 is a vertical transverse section through the clutch, and Fig. 3 is a detail of a modification.

In operating electric railways and similar mechanism it is found desirable to use an electromagnetic clutch to operate the brake mechanism; so, also, in various other appliances it is desirable to use such a clutch—as, for instance, in operating railway-signals; and it is the object of my invention to furnish an exceedingly simple construction which has relatively great power and which may be cheaply made and adapted for many and various uses; and I will now describe one embodiment of the invention, which will be sufficient to enable those skilled in the art to understand the invention and make use of the same.

In the drawings, A represents a shaft which is preferably made of magnetic material and which is mounted in any suitable way, as in the bearings B B' B², and is adapted to be rotated from any desirable source of power through the medium of the spur-wheel C or otherwise. If, for instance, the clutch is used to operate a brake on an electric car, the shaft may be driven from the axle or axles of the car or may, in fact, constitute itself one of the axles of the car.

Mounted on the axle and rigidly connected thereto are some suitable supports D D, shown in the present instance in the form of disks, and these are arranged to rotate with the shaft and are made of some non-magnetic material—as, for instance, brass—and there may be any desired number of these disks, according to the size and character of the clutch. The supports D, whether in the form of disks, spiders, or equivalent construction, are provided with some means to support a number of bars E, and in the present instance I have shown the disks provided with a number of openings in which the bars E fit loosely, but so arranged that the bars rotate with the shaft, while they are free to move longitudinally of the shaft. These bars are made of some magnetic material, as soft iron, and, together with the shaft A when it is of magnetic material, constitute a core for a magnet.

Mounted on some suitable support—as, for instance, the bearing B'—is a coil F of insulated wire, shown as supported in a spool F', attached by brackets F² to the bearing B' and carrying the insulated conductor having terminals $f f'$, adapted to be connected to any suitable source of electric energy. It will thus be seen that the coil F is stationary, while the core made up of the bars E rotates with the shaft A.

Loosely mounted upon the shaft A is an armature or keeper G, forming another portion of the clutch, and this is of some magnetic material—as, for instance, soft iron—and may form a portion of the drum H, which is loosely mounted on the shaft, so that under ordinary conditions the shaft rotates independently of the drum. This drum serves as a medium on which to wind a chain or cord or other connection $h$, connected to a brake or other object to be operated through the medium of the clutch, or, as indicated in Fig. 3, the armature G may be connected to a gear-wheel I, shown in the present instance as a bevel-gear meshing with a similar bevel-gear J on a shaft K, which may serve as a medium on which to wind the cord or chain of the brake or other device to be operated.

From this construction it will be seen that under normal conditions and no current flowing through the coil F the shaft and the supports D, carrying the bars E, will rotate freely, while the armature G may remain stationary; but when current flows through the coil F each of the bars E becomes a magnet and exerts a strong influence upon the armature G, and the bars being free to slide will move into contact with the armature and remain securely attached thereto so long as the current is flowing and cause the armature to rotate with the shaft and through the medium of the drum or other connections operate the brake or other device, unless, perchance, the resistance is too great, when the bars will slip on the face of the armature more or less, but still exert a strong attraction thereon. As soon as the current flowing through the coil ceases the armature will be released and the bars will naturally pass out of contact with the armature and rotate independently thereof.

By providing suitable means for regulating the current flowing through the coil the attractive force between the bars and armature can be regulated so as to meet the requirements of any particular case and so as to prevent injury or destruction to any of the parts, and at the same time, if desired, an exceedingly powerful clutch action is exerted between the bars and armature.

While it is preferable to have the bars move longitudinally of the shaft in their supports, it may be desirable under some conditions to have the armature move in the same direction relatively to the shaft, and in that case the armature may be connected to the drum H by means of interlocking tongues L, although I prefer to have the rods movable.

From practical experience I find it unnecessary to provide any specific device for throwing the armature and rods out of engagement, as such a device would be a waste of power which would have to be overcome in causing the parts of the clutch to engage.

While I have thus described a preferred embodiment of my invention, it is evident that the details of construction and arrangement may be changed by those skilled in the art without departing from the spirit thereof, and it is evident that the clutch is adapted for use for many and various purposes, and by the use of a number of independent bars or rods the efficiency of the clutch is greatly increased with the expenditure of the same amount of electric energy.

What I claim is—

1. An electromagnetic clutch comprising a coil, a number of magnetically-independent bars constituting a core and arranged within the magnetic field of the coil, and an armature operating in connection with the bars, substantially as described.

2. An electromagnetic clutch comprising a shaft, supports connected to rotate with the shaft, independent bars constituting a core and loosely mounted in the supports, a coil, and an armature coöperating with the bars, substantially as described.

3. An electromagnetic clutch comprising a shaft, supports mounted thereon and carrying a number of bars loosely mounted in the supports and forming a core, a coil surrounding the core and rigidly supported with relation to the shaft, and an armature loosely mounted on the shaft and connected to the brake-operating mechanism, substantially as described.

In testimony whereof I have signed my name to this specification in the presence of two subscribing witnesses.

JOSEPH B. STEWART.

Witnesses:
ALEXANDER CRAW,
MIDDLETON A. CARDUCEE.